US005683320A

United States Patent [19]

Friesen et al.

[11] Patent Number: 5,683,320

[45] Date of Patent: Nov. 4, 1997

[54] ENGINE ASSEMBLY WITH BELT DRIVE TO AN ENGINE ACCESSORY

[75] Inventors: Bruce R. Friesen, Dugald; Edward G. Hohenberg, Winnipeg, both of Canada

[73] Assignee: Motor Coach Industries Ltd., Winnipeg, Canada

[21] Appl. No.: 715,566

[22] Filed: Sep. 18, 1996

[51] Int. Cl.[6] .......... F16H 7/00

[52] U.S. Cl. .......... 474/86; 474/150

[58] Field of Search .......... 474/84, 86, 88, 474/94, 101, 108, 148, 150

[56] References Cited

U.S. PATENT DOCUMENTS

| | | | |
|---|---|---|---|
| 2,856,785 | 10/1958 | Steele . | |
| 3,362,243 | 1/1968 | Ferguson . | |
| 3,924,483 | 12/1975 | Walker et al. | 474/86 |
| 4,012,020 | 3/1977 | Dixon et al. | 248/14 |
| 4,296,717 | 10/1981 | Schlagmuller | 474/86 X |
| 4,372,409 | 2/1983 | Mazur | 180/54 |
| 4,841,789 | 6/1989 | Ochiai | 474/84 X |

*Primary Examiner*—Roger J. Schoeppel

*Attorney, Agent, or Firm*—Adrian D. Battison; Murray E. Thrift

[57] ABSTRACT

In an engine assembly including an engine block carried by flexible mounting members on an assembly frame, the engine accessory such as the alternator and compressor are carried on the frame rather than on the engine block itself. The accessories are belt driven from a main drive pulley of the engine. In order to accommodate rotational movement of the engine on the flexible mountings, the accessories are pivotally mounted on the frame and are connected to the engine block by a tensioning assembly which lies generally parallel to a line joining the rotational axes of the drive pulley of the engine and the driven pulley of the accessory. The pivot mounting of the accessory is located underneath the accessory to one side of the line joining the axes and such that the weight of the accessory is communicated through the pivot mounting to the frame rather than to the engine.

7 Claims, 2 Drawing Sheets

ENGINE ASSEMBLY WITH BELT DRIVE TO AN ENGINE ACCESSORY

BACKGROUND OF THE INVENTION

This invention relates to an engine assembly having at least one engine accessory with the engine having a drive pulley and the accessory having a driven pulley so that the accessory is driven by a belt wrapped around the pulleys.

The engine accessory with which the present invention is concerned is of a type which is different from and separate from the main driven element of the engine so that the engine includes an output shaft driving the main driven element and one or more belt drives to one or more separate accessories carried separately from the main driven element.

Various types of engine accessories are driven in this manner including an air conditioning compressor, an alternator, a power steering pump and a fan drive which are necessary for various elements associated with the engine.

The present invention is particularly but not exclusively designed for use with a vehicle in which the engine has a main output shaft for driving a transmission system of the vehicle and one or more accessories belt driven by the engine for providing fluid pressure and electrical power for the vehicle.

Some engine accessories, such as the alternator and the power steering pump, are conventionally rigidly mounted on the engine block so as to be supported thereby and carried at a position to one side of the engine block so that the belt extends from the drive pulley on the engine to a driven pulley on the accessory. It is necessary in most cases, in order to accommodate belt stretch and in order to apply the belt around the pulleys that the accessory is mounted on the engine block in a manner which allows adjustment of the distance from the axis of the drive pulley to the axis of the driven pulley. Normally this mounting includes a pivot mounting at one side of the accessory and a tensioning assembly at an opposite side of the accessory with the tensioning assembly being adjustable in length to move the accessory inwardly and outwardly of the engine block.

Examples of this type of arrangement are shown in U.S. Pat. Nos. 4,372,409 (Mazur), 4,012,020 (Dickson), 3,362,243 (Ferguson) and 2,856,785 (Steele).

Other engine accessories, such as the fan drive and the Air Conditioning compressor may be mounted on the chassis or frame and are supported thereby in fixed position. The accessories are then driven by a belt from the pulley of the engine to the accessory drive pulley. Some adjustment of this fixed position is necessary therefore to allow adjustment of belt tension. The net belt tension force between the engine and frame mounted accessory is thus reacted through the engine and accessory mounts.

It is well known that the vehicle engine should be mounted on flexible mountings relative to the frame of the vehicle in order to accommodate the movement of the engine necessary in response to changes of torque at the output shaft of the engine. Thus the engine tends to rotate about its axis of minimum inertia in response to such changes of torque. The flexible or rubber mountings used therefore allows the engine to slightly rotate thus causing a repeated shifting of the engine relative to the frame.

The accessories which are mounted on the chassis remain fixed as the engine oscillates and hence the distance from the engine drive pulley to the accessory pulley varies and this variation must be taken up by changes in belt tension and stretch. These changes significantly increase wear of the components, and transmit vibration to the frame through the belt tension reaction forces at the engine and accessory mounts.

SUMMARY OF THE INVENTION

It is one object of the present invention therefore to provide an improved engine assembly which allows the engine accessories to be carried on the frame rather than the engine while reducing the loading through the engine and accessory mountings, maintaining a substantially constant tension in the drive belt to the accessory and reducing transmitted engine vibrations to the frame.

According to one aspect of the invention there is provided an engine assembly comprising: an engine having a rotatable output shaft for communicating output torque from the engine; a driven member for receiving the output torque from the output shaft; a frame for supporting the engine; flexible mounting members mounting the engine on the frame for flexible movement relative to the frame to accommodate rotation of the engine on changes of the output torque generated by the engine; at least one engine accessory separate from the driven member; means for driving said at least one engine accessory comprising a drive output pulley on the engine for rotation about a drive axis, a drive input pulley on said at least one engine accessory having an accessory drive axis of the drive input pulley which is parallel to the drive axis and to the output shaft and a drive belt wrapped around the output pulley and the input pulley; means mounting said at least one engine accessory on the frame for pivotal movement relative to the frame about an axis parallel to the accessory drive axis and offset to one side of a plane joining the drive axis and the accessory drive axis such that said pivotal movement causes movement of the accessory drive axis toward and away from the engine; and a tensioning assembly having one end connected to a point fixed relative to the engine and an opposed end connected to said at least engine accessory such that the tensioning assembly communicates said flexible movement of the engine to said at least one engine accessory to maintain a distance between the drive axis and the accessory drive axis substantially constant to maintain the drive belt at a substantially constant tension.

Preferably the tensioning assembly is adjustable in length.

Preferably the tensioning assembly is substantially parallel to a line joining the drive axis and the accessory drive axis, said line being at right angles to said axes.

Preferably the tensioning assembly lies between two runs of the belt with each run being arranged at a respective side of the input pulley and output pulley.

Preferably the tensioning assembly is arranged at an end of said at least one accessory adjacent the pulley and lies in substantially the same plane as the belt.

Preferably said at least one accessory includes a first accessory on one side of the engine and a second accessory on an opposed side of the engine.

Preferably the pivot axis of said at least one accessory lies in a horizontal plane closely adjacent a horizontal plane containing the accessory drive axis such that the distance between the pivot axis and the drive axis of the accessory is approximately equal to the distance from the axis of minimum inertia of the engine and the drive axis of the engine.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
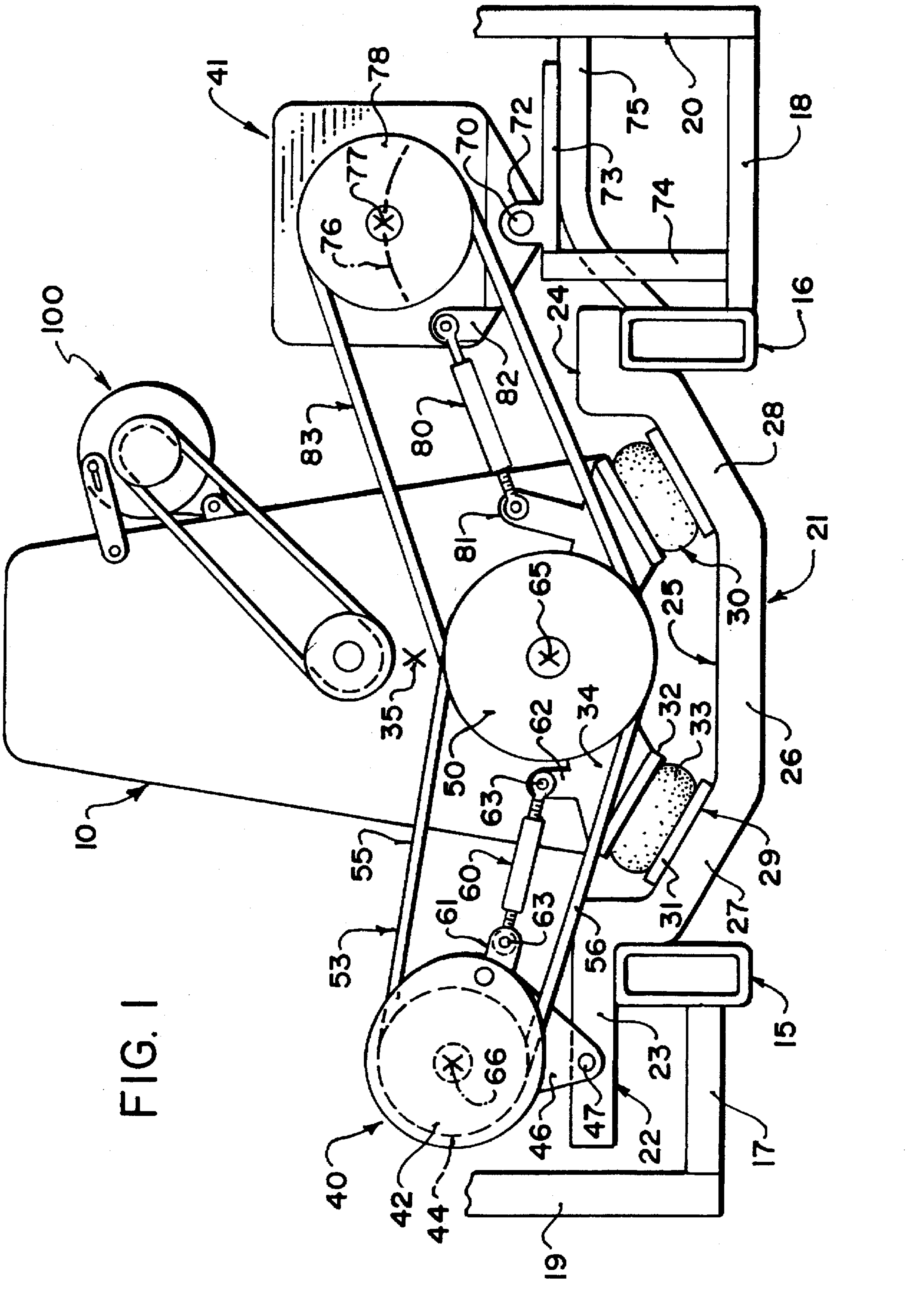
FIG. 1 is a rear elevational view of the engine compartment of a vehicle showing schematically the engine block and two accessories mounted on the frame.
Figure 2:
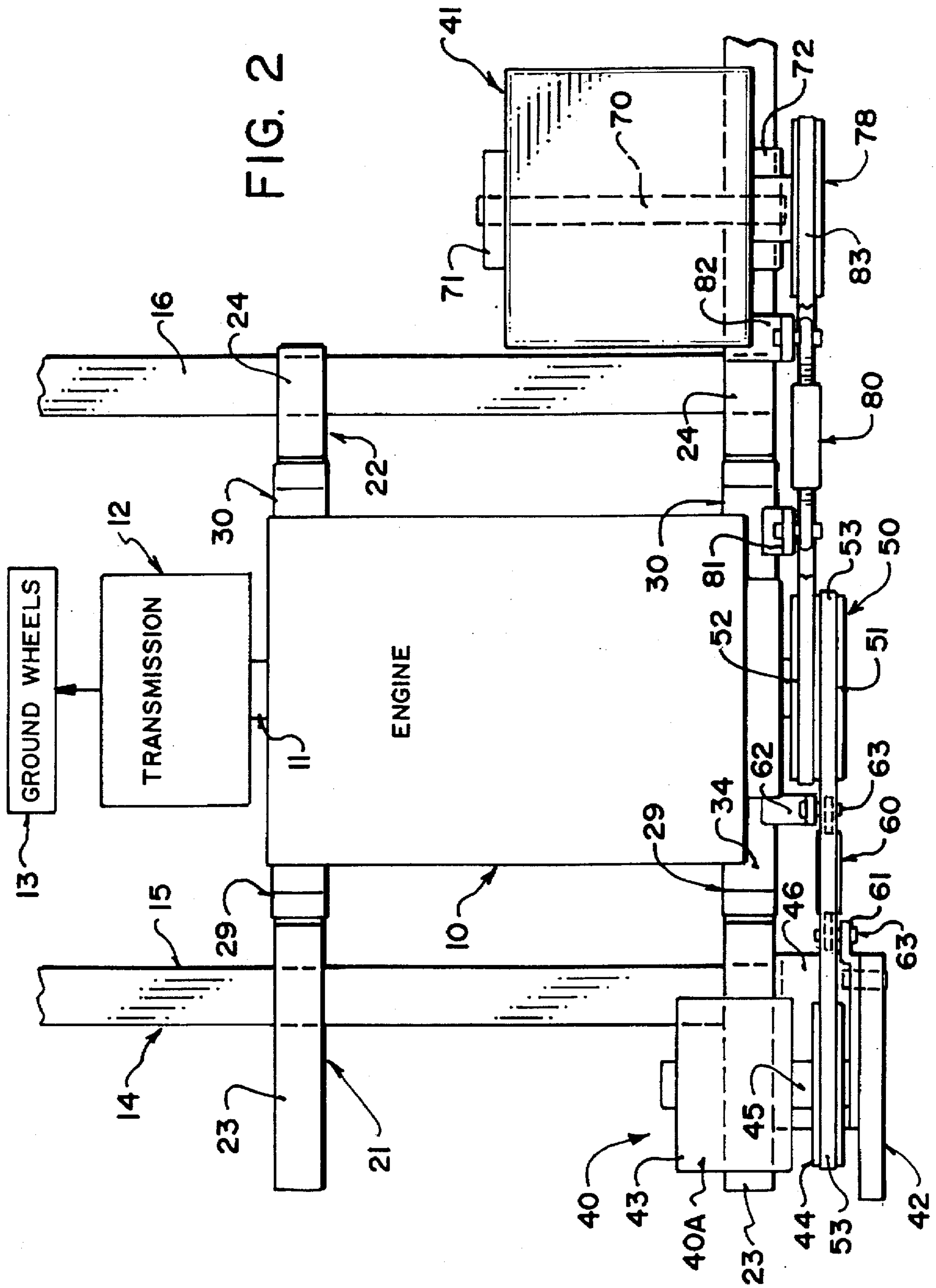
FIG. 2 is a top plan view of the elements of FIG. 1.

The engine assembly shown in FIGS. 1 and 2 is shown, to the most part, schematically and is intended for providing motive power to a vehicle. The assembly comprises an engine block generally indicated at 10 for providing drive through a main drive shaft 11 to a transmission system 12 and from the transmission system 12 to ground wheels schematically indicated at 13.

The assembly is mounted on a frame system 14 of the vehicle including a pair of main longitudinal beams 15 and 16. The frame further incudes a pair of horizontal beams 17 and 18 each extending outwardly to a respective side of the main beam 15 and 16 together with vertical struts 19 and 20. The structure of the frame is shown only in part since the structure is well known to one skilled in the art and can of course be varied in accordance with structural requirements.

The engine block 10 is mounted in a cradle 21 including a pair of transversely extending cradle arms 22 and 23 supported on the main beams 15 and 16. Thus each cradle arm includes two horizontal portions 23 and 24 each overlying a respective one of the beams 15, 16. Suspended downwardly between the two beams 15 and 16 is a generally U-shaped cradling section 25 with a horizontal portion 26 and two inclined sections 27 and 28.

The engine block 10 is mounted on the cradling section 25 by a pair of engine mounts 29 and 30. Each of the four engine mounts comprises a bottom plate 31, a top plate 32 and intervening resilient member 33. The top plate 32 is attached to the engine block by a mounting bracket 34. The bracket 34 is thus rigidly attached to the engine block along with the plate 32 allowing flexible movement of the engine block relative to the plate 31 fixed to the frame through the resilient mounting member 33.

Thus the mounting blocks allow limited rotational movement of the engine about an axis 35 of minimum inertia of the engine on changes of torque generated by the engine and communicated to the transmission 12.

The engine further includes two engine accessories 40 and 41. The accessory 40 in one example comprises a drive for the cooling fan of the engine for the vehicle and the accessory 41 in one example is an A/C compressor for generating compressed refrigerant for cooling of the vehicle. These items are shown only schematically since they are well known to one skilled in the art and are commercially available and since the accessories can of course be varied in accordance with requirements.

The accessory 40 includes a main end plate 42 supporting a body 43 with a pulley 44 supported on the body and rotatable to drive a shaft 45 of the accessory. The main end plate 42 is attached to an arm 46 which is attached to the end plate at a position adjacent the engine and extends downwardly to a pivot pin 47 connected to an end of the horizontal portion 23 of the front cradle.

Thus the accessory body and the end plate attached thereto is carried on the arm 46 and is supported above the pin 47 for pivotal movement in an arc around the pin 47.

The engine includes a main accessory drive pulley 50 mounted on a housing on the front face of the engine block for driving accessories 40 and 41. The pulley 50 has two pulley sections including a front pulley section 51 and a rear pulley section 52. The front pulley section 51 carries a belt 53 arranged for driving the pulley 44 on the shaft 45 of the accessory 40. The pulley 44 is arranged behind the main support plate 42 and in front of the arm 46 so that the two runs of the belt pass therebetween including an upper run 55 and a lower run 56 of the belt 53.

The accessory is connected to the engine block solely by a tensioning assembly 60 which extends from a lug 61 connected to the arm 46 of the accessory to a lug 62 connected to the bracket 34 of the mounting block 29. The tensioning assembly is connected at each end to the respective lug by a pivot pin 62, 63 allowing pivotal movement between the lugs and the tensioning assembly. The tensioning assembly incudes a threaded section at each end extending into a central turnbuckle section so that the length of the tensioning assembly can be adjusted to accommodate stretch in the belt.

The tensioning assembly is arranged at the forward end of the accessory at a vertical plane directly in the vertical plane of the belt 53. The tensioning assembly extends generally parallel to the bottom run 56 of the belt and between the bottom run 56 and the upper run 55. The tensioning assembly is substantially parallel to an imaginary line joining a drive axis 65 of the pulley 50 and a drive axis 66 of the pulley 44. Thus the net belt tension reaction force is taken up through the tensioning assembly 60, and eliminated from the engine mounts 33 and accessory mount at the pivot pin 47.

The pivot pin 47 is offset to one side of the line joining the axis 65 and 66. The pivot pin 47 is arranged substantially directly beneath the axis 66 at a distance that is approximately equal to the distance from the drive axis 65 to the minimum inertia axis 35, and so that the weight from the accessory 41 is applied vertically downwardly to the pin 47 rather than to the engine.

However rotational movements of the engine about the axis 35 are communicated through the tensioning assembly to the accessory so that the accessory pivots about the pin 47 driven by the tensioning assembly to accommodate the movement of the engine. As the tensioning assembly is parallel to the line joining the axes 65 and 66, the accessory moves through a distance substantially equal to the movement of the engine in the area of the pulleys 44 and 50 so that the distance between the axes 65 and 66 is maintained substantially constant and the tension in the belt 53 is maintained substantially constant.

The accessory 41 is mounted in a similar manner. The accessory 41 is however of a larger mass so instead of being mounted on an end plate and the single pivot pin as is the accessory 40, the accessory 41 is mounted on a horizontal shaft 70 carried in bearings 71 and 72 at rear and forward ends of the accessory body and carried on a horizontal plate 73 supported on additional vertical beam 74 and horizontal beam 75 of the frame.

In a similar manner, therefore, the weight of the accessory 41 is communicated vertically downwardly onto the shaft 70 so that the weight of the accessory is carried on the frame rather than on the engine block. Similarly the accessory 41 can pivot so that an axis 77 of the pulley 78 thereof can pivot on the shaft 70, such that the distance from axis 77 to the shaft is approximately equal to the distance from axis 35 to axis 65. Thus the tensioning assembly 80 is pivotally connected to a lug 81 carried on the bracket of the mounting block 30 and is pivotally connected at its opposed end to a lug 82 attached to the body of the accessory 41. Similarly, the net belt tension reaction force is taken up by the tensioning assembly 80 and eliminated from the engine mounts 33 and accessory pivot shaft 70.

Similarly the tensioning assembly 80 is closely adjacent the vertical plane of the belts at the forward end of the accessory 41 and lies along a line generally parallel a line joining the axes 65 and 77.

In this way the accessories 40 and 41 are carried in a manner which allows their movement relative to the frame to accommodate the pivotal movement of the engine so that the belts 53 and 83 remain substantially constant in tension. The upper run of the belt 83 is shown broken away to reveal the tensioning assembly 80.

The accessory 40 is for example the fan drive to the engine cooling system comprising a fan clutch 40A. The accessory 41 is for example the air conditioning compressor. A further accessory which is for example the alternator is indicated at 100 driven by a separate pulley and directly mounted on the engine block in conventional manner.

Since various modifications can be made in our invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An engine assembly comprising:

an engine having a rotatable output shaft for communicating output torque from the engine;

a driven member for receiving the output torque from the output shaft;

a frame for supporting the engine;

flexible mounting members mounting the engine on the frame for flexible movement relative to the frame to accommodate rotation of the engine on changes of the output torque generated by the engine;

at least one engine accessory separate from the driven member;

means for driving said at least one engine accessory comprising a drive output pulley on the engine for rotation about a drive axis, a drive input pulley on said at least one engine accessory having an accessory drive axis of the drive input pulley which is parallel to the drive axis and to the output shaft and a drive belt wrapped around the output pulley and the input pulley;

means mounting said at least one engine accessory on the frame for pivotal movement relative to the frame about an axis parallel to the accessory drive axis and offset to one side of a plane joining the drive axis and the accessory drive axis such that said pivotal movement causes movement of the accessory drive axis toward and away from the engine;

and a tensioning assembly having one end connected to a point fixed relative to the engine and an opposed end connected to said at least one engine accessory such that the tensioning assembly communicates said flexible movement of the engine to said at least one engine accessory to maintain a distance between the drive axis and the accessory drive axis substantially constant to maintain the drive belt at a substantially constant tension.

2. The engine assembly according to claim 1 wherein the tensioning assembly is adjustable in length.

3. The engine assembly according to claim 1 wherein the tensioning assembly is substantially parallel to a line joining the drive axis and the accessory drive axis, said line being at right angles to said axes.

4. The engine assembly according to claim 1 wherein the tensioning assembly lies between two runs of the belt with each run being arranged at a respective side of the input pulley and output pulley.

5. The engine assembly according to claim 1 wherein the tensioning assembly lies in a common vertical plane with the drive belt to the pulley.

6. The engine assembly according to claim 1 wherein said at least one accessory includes a first accessory on one side of the engine and a second accessory on an opposed side of the engine.

7. The engine assembly according to claim 1 wherein the pivot axis of said at least one accessory lies in a horizontal plane closely adjacent a horizontal plane containing the accessory drive axis such that the distance between the pivot axis and the drive axis of the accessory is approximately equal to the distance from the axis of minimum inertia of the engine and the drive axis of the engine.

* * * * *